(12) United States Patent
Andersson et al.

(10) Patent No.: US 6,434,380 B1
(45) Date of Patent: Aug. 13, 2002

(54) DYNAMIC NEGOTIATION OF RESOURCES FOR USER EQUIPMENT IN WIRELESS COMMUNICATIONS SYSTEM

(75) Inventors: Christoffer Andersson, Palo Alto, CA (US); Gerke Hilbrand Spaling; Frank Bastiaan Brouwer, both of Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/460,238

(22) Filed: Dec. 13, 1999

(51) Int. Cl.[7] .............................................. H04M 11/00
(52) U.S. Cl. .................. 455/406; 455/408; 379/114.01; 379/114.06; 379/114.12
(58) Field of Search ................................. 455/406, 407, 455/408, 403, 414, 575; 379/114.01, 114.03, 114.05, 114.06, 114.07, 114.08, 114.1, 114.12, 144.06

(56) References Cited

U.S. PATENT DOCUMENTS

| | | | |
|---|---|---|---|
| 5,442,625 A | | 8/1995 | Gitlin et al. ................. 370/342 |
| 5,488,655 A | * | 1/1996 | Hamlen .................. 379/114.06 |
| 5,517,555 A | * | 5/1996 | Amadon et al. ............. 455/408 |
| 5,583,869 A | | 12/1996 | Grube et al. ................. 370/347 |
| 5,625,877 A | | 4/1997 | Dunn et al. .................. 455/454 |
| 5,745,480 A | | 4/1998 | Behtash et al. ............. 370/252 |
| 5,794,140 A | * | 8/1998 | Sawyer ........................ 455/408 |
| 5,802,502 A | * | 9/1998 | Gell et al. .............. 379/114.12 |

FOREIGN PATENT DOCUMENTS

| | | |
|---|---|---|
| WO | 95/30317 Ad | 11/1995 |
| WO | 97/37503 A | 10/1997 |
| WO | 99/00971 A | 1/1999 |

* cited by examiner

Primary Examiner—Nay Maung
Assistant Examiner—Quochien B. Vuong
(74) Attorney, Agent, or Firm—Nixon & Vanderhye, P.C.

(57) ABSTRACT

A telecommunications system (18) has a capacity management system (100) which provides a user equipment unit agent (150) for each wireless user equipment unit (20) with which a connection is to be established. The user equipment agent negotiates resources for the prospective connection to be established with its corresponding user equipment unit. In the negotiation, the user equipment agent determines a number of purchase units expendable by the user equipment unit for the negotiation, and issues a resource request to begin the negotiation. Each resource has a resource unit price at which a unit of the resource is sold. In response to the resource request issued by the user equipment agent, connection resources are allocated to the user equipment unit in accordance with what the number of purchase units expendable by the user equipment unit can afford. The resource unit price for the resources is dynamically adjusted, e.g., in accordance with load on the telecommunication system. The resources can include such capabilities as transmission power, spreading code, bit rate, and a number of handover legs (for diversity purposes).

29 Claims, 11 Drawing Sheets

Fig. 5
ADAPTIVE CONTROL SYSTEM

DYNAMIC NEGOTIATION OF RESOURCES FOR USER EQUIPMENT IN WIRELESS COMMUNICATIONS SYSTEM

BACKGROUND

1. Field of the Invention

The present invention pertains to wireless telecommunications, and particularly to processes of obtaining resources of a wireless telecommunication system in connection with admitting and/or sustaining a call with a mobile user equipment unit (UE).

2. Related Art and Other Considerations

Cellular telecommunications systems employ a wireless link (e.g., air interface) between a (mobile) user equipment unit and a base station (BS) node. The base station node has transmitters and receivers for radio connections with numerous user equipment units. One or more base station nodes are connected (e.g., by landlines or microwave) and managed by a radio network controller node (also known in some networks as a base station controller [BSC]). The radio network controller node is, in turn, connected through control nodes to a core communications network. Control nodes can take various forms, depending on the types of services or networks to which the control nodes are connected. For connection to connection-oriented, switched circuit networks such as PSTN and/or ISDN, the control node can be a mobile switching center (MSC). For connecting to packet switching data services such as the Internet (for example), the control node can be a gateway data support node through which connection is made to the wired data networks, and perhaps one or more serving nodes.

A telecommunications connection between a mobile user equipment unit and another party (e.g., in the core communications network or another mobile user equipment unit) thus involves an uplink from the mobile unit through a base station and a radio network controller (RNC), and a downlink in the reverse direction. In some types of telecommunications systems, control and user information is transmitted in frames both on the uplink and downlink.

Typically the radio network controller (RNC) has complex processes for allocating resources for a call involving a user equipment unit (UE), including processes for allocating such resources as power, bitrate, etc. Generally, as the telecommunication system undergoes evolution from one generation to a more sophisticated generation, these processes must be overhauled for compatibility with the enhanced sophistication. Overhauling of the processes usually requires extensive revision of software and the like involved in these processes.

What is needed, therefore, and an object of the present invention, is capability for adding enhanced functionality to a telecommunication system without requiring fundamental revision of pre-existent processes.

BRIEF SUMMARY OF THE INVENTION

A telecommunications system has a user equipment unit agent for each wireless user equipment unit with which a connection is to be established. The user equipment agent negotiates resources with a capacity management system for the prospective connection to be established with its corresponding user equipment unit. In the negotiation, the user equipment agent determines a number of purchase units expendable by the user equipment unit for the negotiation, and issues a resource request to begin the negotiation. Each resource has a resource unit price at which a unit of the resource is sold. In response to the resource request issued by the user equipment agent, connection resources are allocated to the user equipment unit in accordance with what the number of purchase units expendable by the user equipment unit can afford.

The resource unit prices for the resources are posted on a resource price list. The resource unit price for the resources is dynamically adjusted, e.g., in accordance with load on the telecommunication system. The resources can include such capabilities as transmission power, spreading code, bit rate, and a number of handover legs (for diversity purposes).

As one aspect of the invention, the total number of purchase units for a connection is utilized collectively by the user equipment agent to obtain resources for a connection. In another aspect, the number of purchase units expendable by the user equipment unit is classified into a number of purchase units expendable for each of the plural connection resources, and the resource request is processed on a per connection resource basis with respect to-the classification.

In one embodiment, after the resources are initially allocated, the user equipment unit agent re-negotiates for the respective resource. The user equipment agent can commence the re-negotiation either on its own initiative, or in accordance with a change in status in the telecommunication system. As a variation of this embodiment, a load manager can apprise the user equipment unit agent of a status change in the telecommunication system, so that the user equipment unit agent re-negotiates in response to the status change.

As a further aspect of the invention, the resource unit prices for the resources can be dynamically adjusted by an adaptive control system. The adaptive control system can be utilized to determine the load on the telecommunication system, with a change in load being used dynamically to adjust the-resource unit price for one or more of the plural connection resources. The adaptive control system can determine a predicted load on the telecommunication system by using a long term prediction profile and a short term prediction profile.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
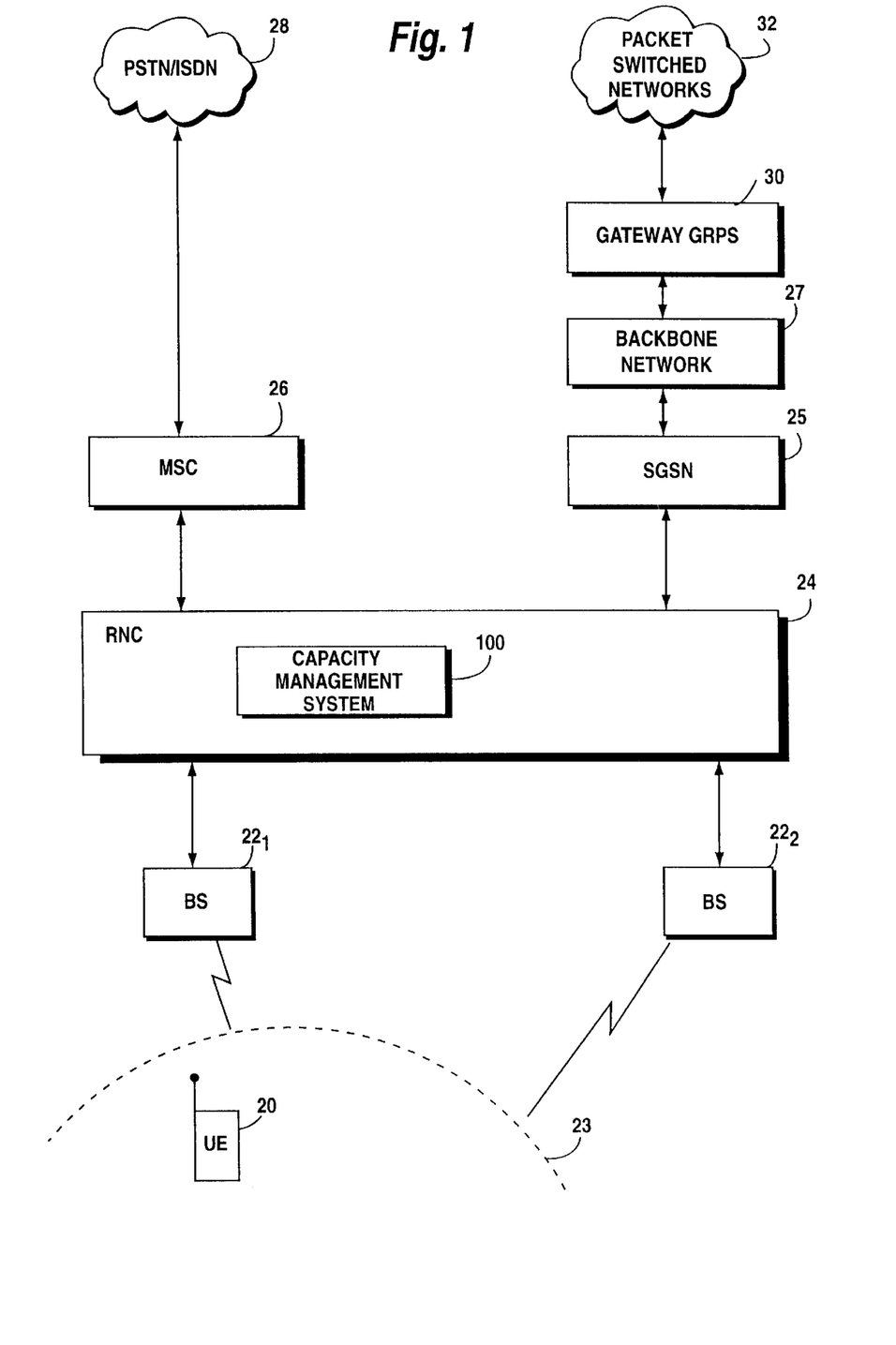
FIG. 1 is a schematic view of a telecommunication system according to an embodiment of the present invention.

FIG. 1 shows a telecommunications network 18 in which a user equipment unit 20 communicates with one or more base stations 22 over air interface (e.g., radio interface) 23. Base stations 22 are connected by terrestrial lines (or microwave) to radio network controller (RNC) 24 [also known as a base station controller (BSC) in some networks]. The radio network controller (RNC) 24 is, in turn, connected through a control node known as the mobile switching center 26 to circuit-switched telephone networks (PSTN/ISDN) represented by cloud 28. In addition, radio network controller (RNC) 24 is connected to Serving GPRS Support Node (SGSN) 25 and through backbone network 27 to a Gateway GRPS support node (GGSN) 30, through which connection is made with packet-switched networks (e.g., the Internet, X.25 external networks) represented by cloud 32.

As understood by those skilled in the art, when user equipment unit 20 participates in a mobile telephonic connection, signaling information and user information from user equipment unit 20 are transmitted over air interface 23 on designated radio channels to one or more of the base stations 22. The base stations have radio transceivers which transmit and receive radio signals involved in the connection or session. For information on the uplink from the user equipment unit 20 toward the other party involved in the connection, the base stations convert the radio-acquired information to digital signals which are forwarded to radio network controller (RNC) 24. The radio network controller (RNC) 24 orchestrates participation of the plural base stations 22 which may be involved in the connection or session, since user equipment unit 20 may be geographically moving and handover may be occurring relative to the base stations 22. On the uplink, radio network controller (RNC) 24 picks frames of user information from one or more base stations 22 to yield a connection between user equipment unit 20 and the other party, whether that party be in PSTN/IDSN 28 or on the packet-switched networks (e.g., the Internet) 32.

The example embodiments illustrated herein happen to employ code division multiple access (CDMA), wherein the information transmitted between a base station and a particular mobile station is modulated by a mathematical code (such as spreading code) to distinguish it from information for other mobile stations which are utilizing the same radio frequency. Thus, in CDMA, the individual radio links are discriminated on the basis of codes. Various aspects of CDMA are set forth in Garg, Vijay K. et al., *Applications of CDMA in Wireless/Personal Communications*, Prentice Hall (1997). In view of the diversity aspects of CDMA, the user equipment unit 20 in FIG. 1 is depicted as being in contact with multiple base stations 22 (e.g., base station $22_1$ and base station $22_2$).

Figure 2:
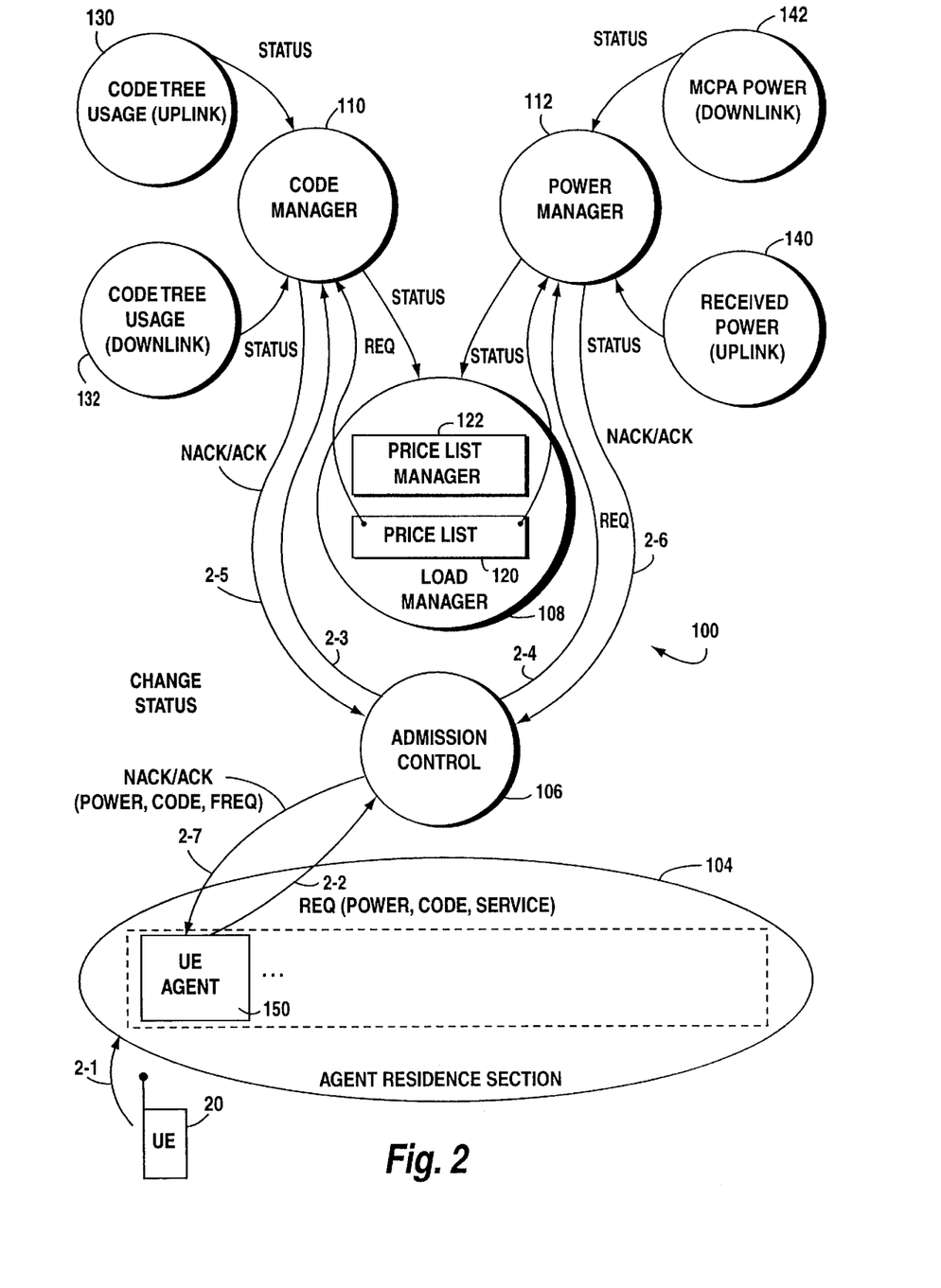
FIG. 2 is a diagrammatic view of one embodiment of a capacity management system for a node of the telecommunication system of FIG. 1.

An important aspect of the telecommunication system 18 of FIG. 1 is capacity management system 100 and an agent residence section 104. Both capacity management system 100 and an agent residence section 104 are preferably located at the radio network controller (RNC) node 24 of telecommunication system 18. The functions of capacity management system 100 and an agent residence section 104 are, at least in one embodiment, performed by coded instructions which are executed by one or more (e.g., distributed) processors of radio network controller (RNC) node 24. Details of an example capacity management system 100 are illustrated in FIG. 2 in which all elements (except user equipment unit 20 and an agent residence section 104) are included in capacity management system 100.

The example capacity management system 100 includes admission control unit 106; load manager 108, and plural resource managers such as code manager 110 and power manager 112. The load manager 108 includes a price list 120 and a price list manager 122. The code manager 110 receives status communications from uplink code tree usage monitor 130 and downlink code tree usage monitor 132. In similar fashion, power manager 112 receives status communications from MCPA downlink power monitor 140 and uplink (received) power monitor 142. In one example version, capacity management system 100 is responsible for, and therefore associated with, a single cell. In such example version, there are separate instances of capacity management system 100 for each cell controlled by the radio network controller (RNC) node 24.

Whenever a connection is requested between user equipment unit 20 and telecommunication system 18 (as represented by action 2-1 in FIG. 2), a user equipment agent is allocated in agent residence section 104 for the potential connection. In this regard, the user equipment agent is a programming block which includes data and executable code allocated for the user equipment unit 20. Therefore, for each connection with a user equipment unit (UE) controlled by the radio network controller (RNC) node 24 having capacity management system 100, an user equipment agent is allocated in agent residence section 104. For the particular user equipment unit 20 shown in FIG. 2, user equipment agent 150 is illustrated. For simplicity the user equipment agents for other user equipment units (UE) having connections with the telecommunication system 18 through radio network controller (RNC) node 24 are not shown in agent residence section 104 of FIG. 2.

Whereas an agent residence section 104 has been described above as being separate and distinct from capacity management system 100, in other embodiments the an agent residence section 104 can be included as part of capacity management system 100. In either case, example details of basic aspects of user equipment agent 150 can be as shown in FIG. 4. The user equipment agent 150 includes connection request handler 152; admission request preparer 154; subscription access function 156; and, resource purchase unit calculator 158. Operations of these example constituent functional aspects of user equipment agent 150 are understood in connection with the ensuing description of events depicted in FIG. 2 and FIG. 3.

When a request for a connection with/by user equipment unit 20 occurs (such as that depicted by action 2-1 in FIG. 2), the request is processed by connection request handler 152 of user equipment agent 150 (see FIG. 4). As indicated by action 3-1 of FIG. 3, the connection request handler 152 invokes the subscription access function 156 to obtain subscription information characterizing the capabilities and privileges of user equipment unit 20. In this respect, such subscription information for a user equipment unit (UE) is typically stored at a home location register (HRL) for the user equipment unit (UE). Therefore, the subscription access function 156 may participate in various messages and/or signaling (well known to the person skilled in the art) in order to obtain certain subscription information for user equipment unit 20.

The subscription information obtained by subscription access function 156 relative to user equipment unit 20 is either obtained as, or converted to, a number of purchase units for each connection resource which needs to be utilized by user equipment unit 20. In this regard, in order to establish a connection with telecommunication system 18 the user equipment unit 20 will require certain resources, such as transmission power, a spreading code (for a CDMA system), a permissible number of handover legs (for a CDMA system), etc. Moreover, the subscription information for the user equipment unit 20 (based, e.g., on a subscription agreement with the owner of user equipment unit 20), indicates what types of services, priorities, and privileges to which the user equipment unit 20 is entitled, the degree of such likely being dependent upon the monetary subscription price specified in the subscription agreement. The subscription access function 156 quantifies the subscription information, e.g., by according either (1) a total number of "purchase units" expendable by user equipment 20, or (2) a number of "purchase units" as being expendable by user equipment unit 20 for each of the plural respective resources. As explained in more detail herein, the purchase units are to be used as, e.g., money or currency for the user equipment agent 150 to negotiate resources with admission control unit 106. As shown in FIG. 4, subscription access function 156 has purchase units for each of N number of connection resources, ranging from purchase units [indicated by box 170(1)] for a first resource [resource #1]) to purchase units [indicated by box 170(N)] for resource #N.

In one aspect of the invention, as depicted by action 3-2 of FIG. 4, the purchase units quantified or otherwise obtained by subscription access function 156 are applied to resource purchase unit calculator 158. The resource purchase unit calculator 158 determines the total purchasing power of user equipment unit 20 based upon the purchase units stored at subscription access function 156. In this mode of the invention, the total purchasing power of user equipment unit 20 (in purchase units) is supplied to admission request preparer 154 (see action 3-3). The admission request preparer 154 also receives from connection request handler 152 (as indicated by action 3-4) a listing of the particular resources desired for the requested connection.

The admission request issued by user equipment agent 150 on behalf of user equipment unit 20 is illustrated as action 2-2 in FIG. 2. As obtained from connection request handler 152, the admission request of action 2-2 lists the particular resources desired for the requested connection (e.g., transmit power, spreading codes, frequency requirements, etc.), as well as the spending capability (e.g., number of resource purchase units) of user equipment unit 20. The admission request 2-2 is handled by admission control unit 106. In coordinated fashion, admission control unit 106 apprises various resource managers of the request for resources for the connection with user equipment unit 20. Although only two example resource managers are illustrated in FIG. 2, it should be understood that managers for other resources behave in like manner as those illustrated. In this regard, as action 2-3 and action 2-4 the admission control unit 106 sends a code request and a power request to code manager 110 and power manager 112, respectively.

Figure 3:
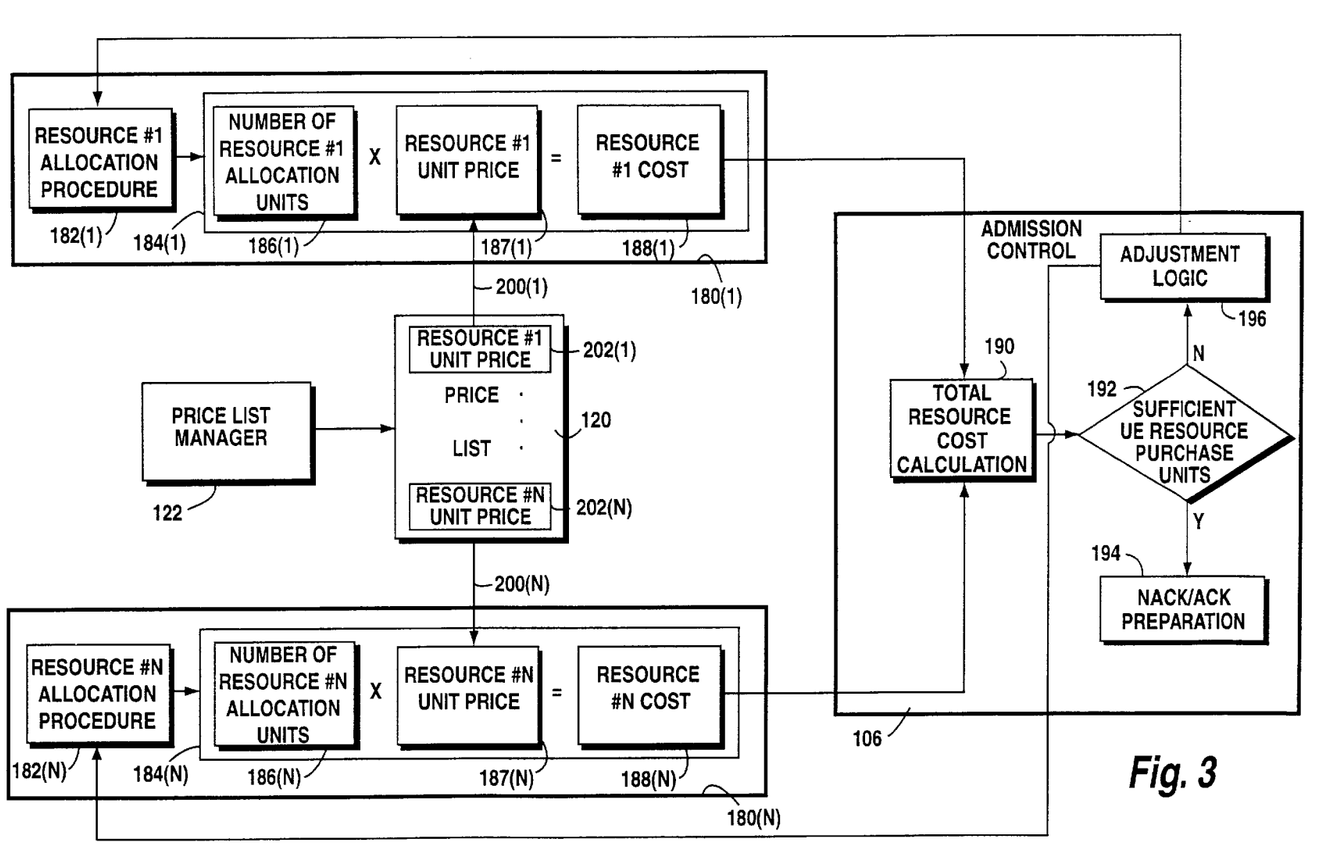
FIG. 3 is a diagrammatic view showing basic operations performed in connection with certain aspects of resource negotiation in the capacity management system of FIG. 2 in the embodiment of FIG. 1.
Figure 4:
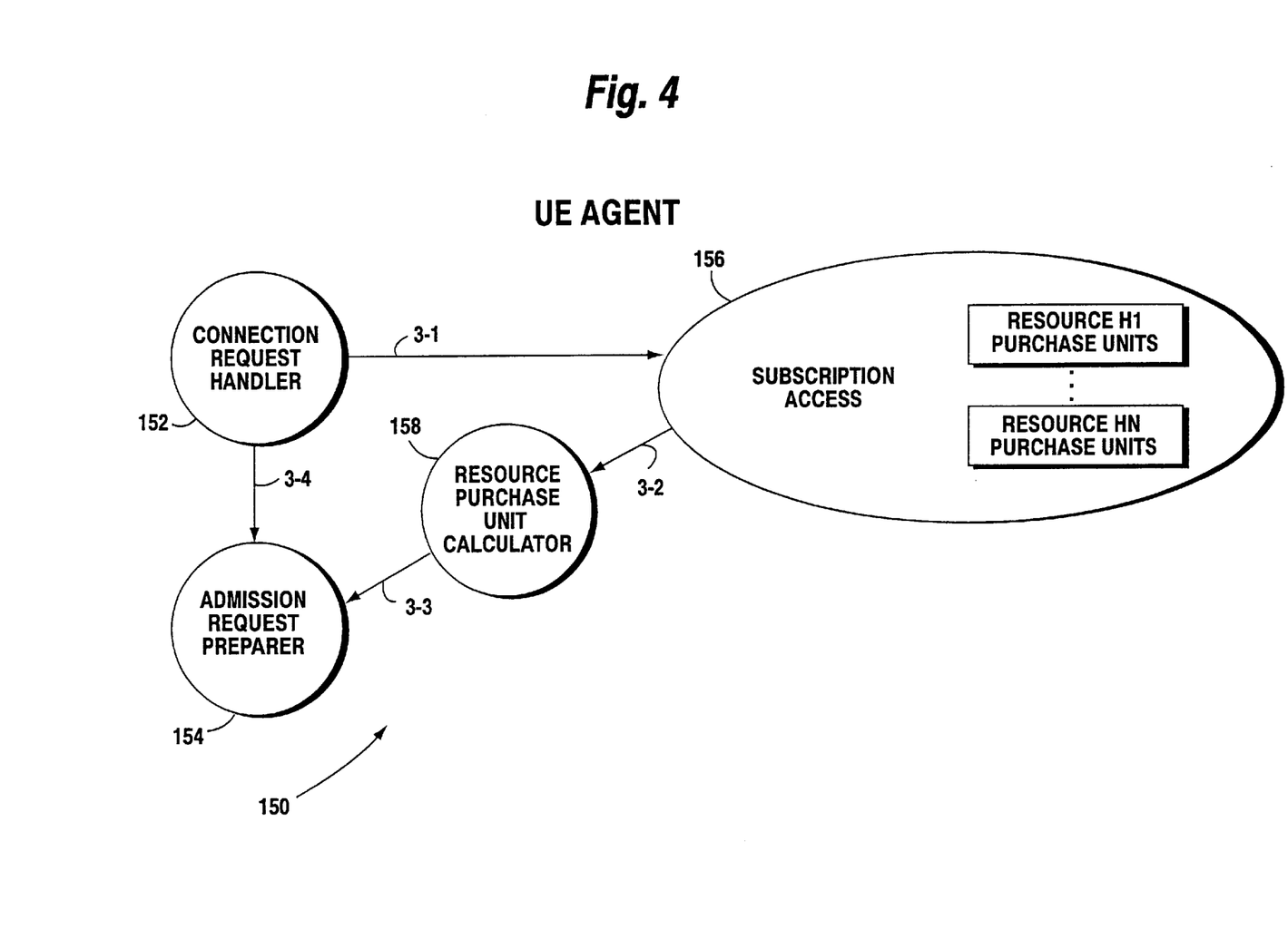
FIG. 4 is a diagrammatic view of basic functions performed by a user equipment unit agent of the telecommunication system of FIG. 1.

Basic actions performed by typical resource managers are exemplified in FIG. 3 with reference to example resource managers 180(1) and 180(N). Each resource manager 180 includes a resource allocation procedure 182 and a resource cost calculator 184. The resource allocation procedure 182 quantifies the request for the resource by assigning a number of allocation units to the request, the number assignment being based on the extent to which the resource is requested or required for the prospective no connection with user equipment unit 20. The number of allocation units for the resource is sent to resource cost calculator 184, which (as shown in FIG. 3) determines a resource cost or price tag (188) for the resource by multiplying the number of allocation units for the resource (186) by the current allocation unit price for the resource (187).

The actions described with reference to resource allocation procedure 182 and resource cost calculator 184 of FIG. 3 are applicable to each of the resource managers which are requested to provide resources for a prospective connection with user equipment unit 20. For example, such actions are performed by code manager 110 and power manager 112 of FIG. 2.

In one aspect of the invention, the resource cost or price tag (188) for each requested resource from each participating resource manager is sent to admission control unit 106, which determines a total price tag at operation 190 thereof (see FIG. 3). In FIG. 2 the resource cost or price tags 188 is are shown as being sent to admission control unit 106 from code manager 110 and power manager 112 by actions 2-5 and 2-6, respectively. At step 192, admission control unit 106 determines whether the user equipment agent 150 for user equipment unit 20 has enough resource purchase units to afford the total price tag of all allocated resources. If the user equipment agent 150 has 5 enough resource purchase units, at step 194 the admission control unit 106 prepares an advisory to user equipment agent 150 that the connection will be granted with the allocated connection resources. The advisory of successful negotiation and purchase of connection resources for admission is illustrated as action 2-7 in FIG. 2.

If user equipment agent 150 is unable to afford the allocated connection resources, at step 196 the admission control unit 106 engages in resource adjustment logic. The resource adjustment logic of step 196 advises the resource allocation procedures 182 of one or more of the resource managers 180 of the over-budget calculation, and affords the resource allocation procedure(s) 182 an opportunity to allocate a less expensive extent of resources to user equipment unit 20.

In accordance with the present invention, the resource unit price for each of the plural connection resources is dynamically adjusted in accordance with load on the telecommunication system. In this regard, as shown in FIG. 2 and FIG. 3, the resource unit price 187 for each resource is periodically or otherwise updated as indicated by action 200. In FIG. 2, action 200(1) reflects an update of the unit price 187(1) for resource #1; action 200(N) reflects an update of the unit price 187(N) for resource #N.

FIG. 3 shows price list 120 as having a unit price [202(1)] for resource #1 and a unit price for a variety of other resources including resource #N [202(N)]. The updated unit prices are obtained from price list 120, which in turn is updated by price list manager 122. The price list manager 122 can adjust or change the prices 202 in price list 120 in accordance with any specified criteria or impetus, an example of which pertaining to an adaptive control system is subsequently described herein.

Thus, as understood from the foregoing, admission control unit 106 responds to the admission request from user equipment agent 150 by allocating connection resources to the user equipment unit in accordance with what the number of purchase 30 units expendable by the user equipment unit can afford.

Figure 2A:
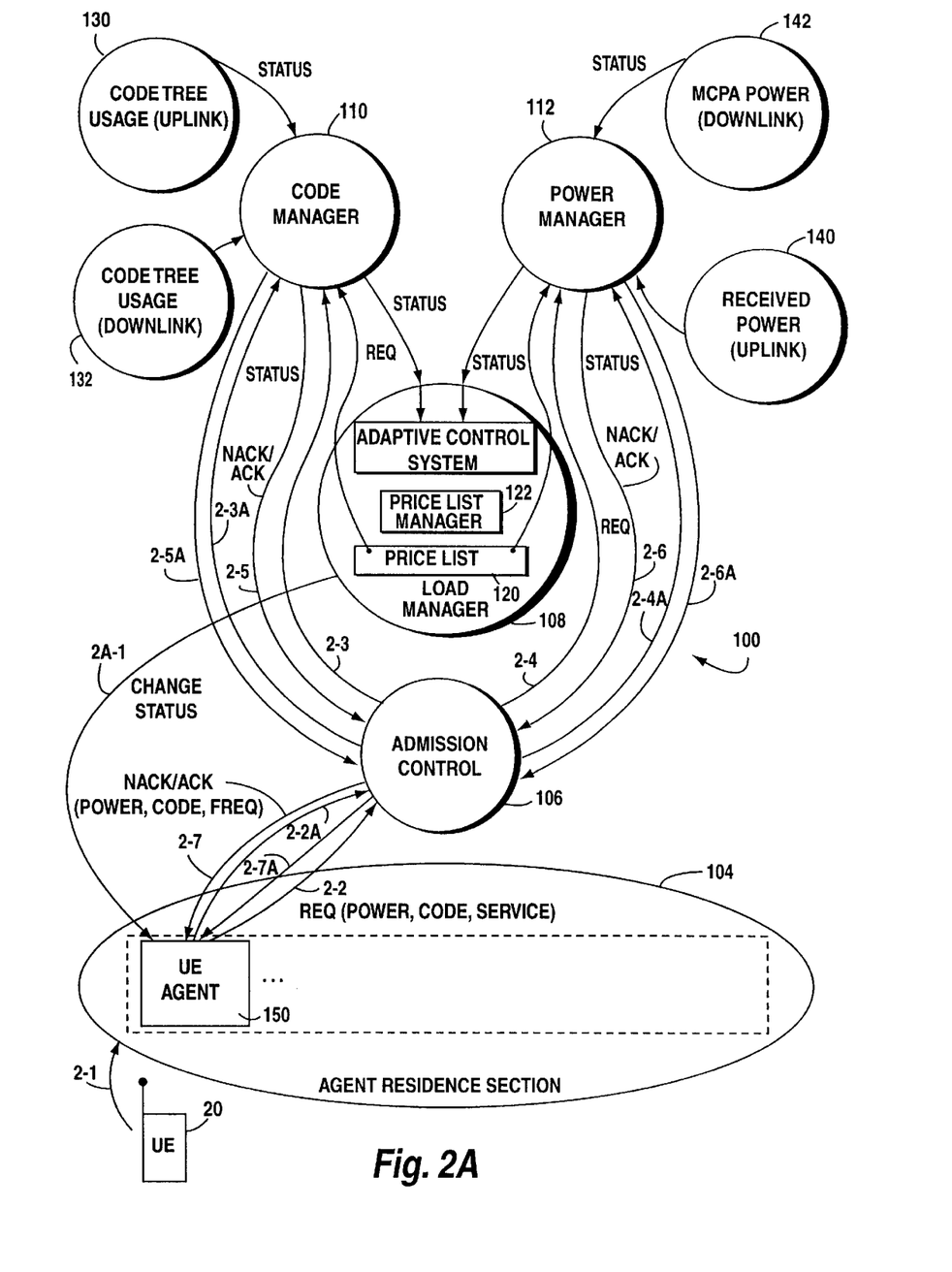
FIG. 2A is a diagrammatic view of an embodiment of a capacity management system for a node of the telecommunication system of FIG. IA.

FIG. 2A shows another embodiment of the capacity management system 100 present invention in which the user equipment agent 150 not only makes an admission request of capacity management system 100, but also re-negotiates for connection resources after an initial allocation of resources have been made. The user equipment agent 150 can periodically initiate such re-negotiations on its own behalf, or can do so as a result of a changed status in telecommunication system 18. The embodiment of capacity management system 100 shown in FIG. 2A differs from that shown in FIG. 2 primarily in that load manager 108 sends change status notifications (such as that depicted by action 2A-1) to user equipment agent 150, and in that user equipment agent 150 re-negotiates connection resources with capacity management system 100.

A change status notification 2A-1 can be triggered by any predetermined change in the network, such as a predetermined degree of change in load conditions in telecommunication system 18. The change status notification 2A-1 can carry with it an indication of the nature of the change, and (optionally) an indication of the degree of the change.

Figure 3A:
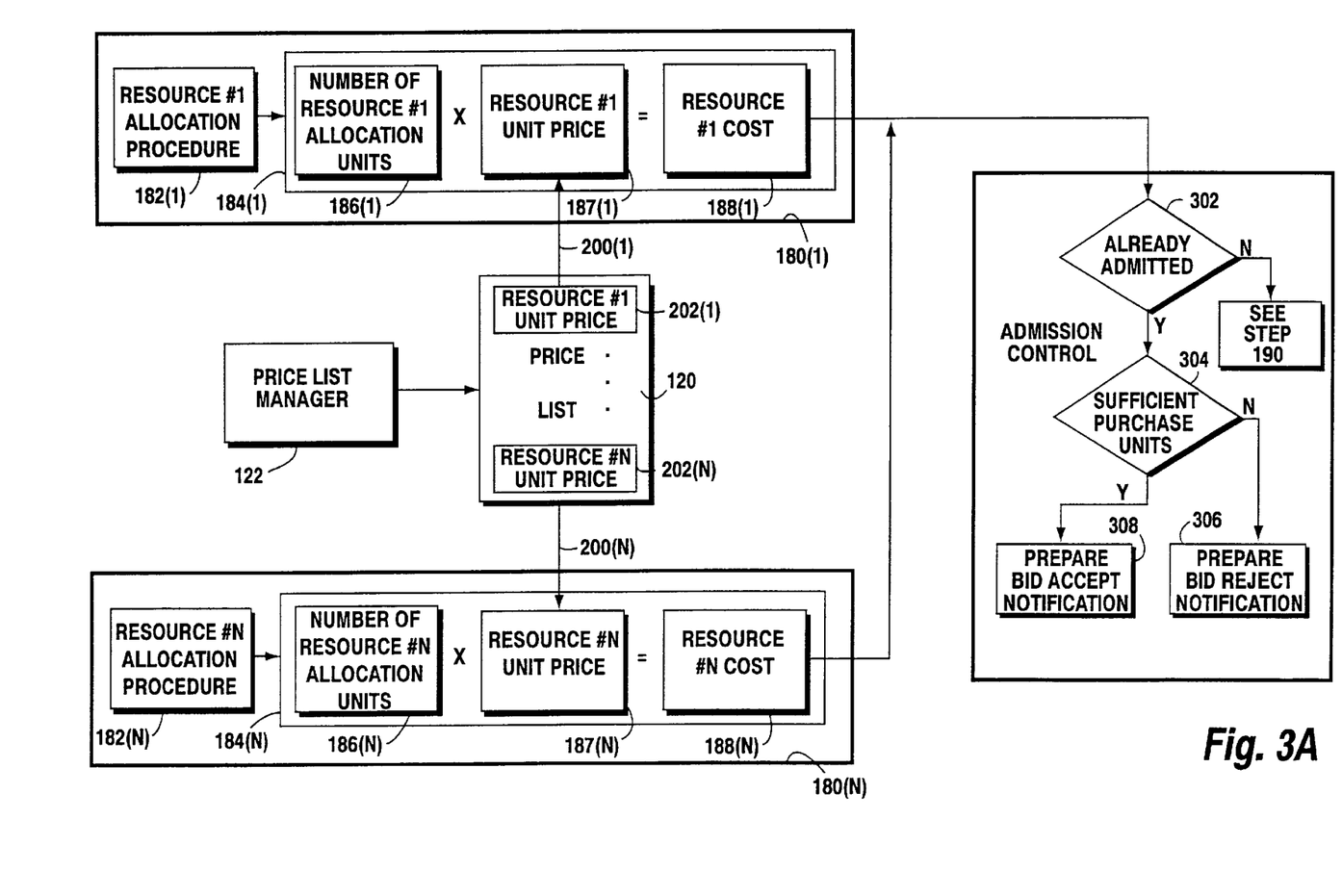
FIG. 3A is a diagrammatic view showing basic operations performed in connection with certain aspects of resource negotiation in the capacity management system of FIG. 2A in the embodiment of FIG. 1.
Figure 4A:
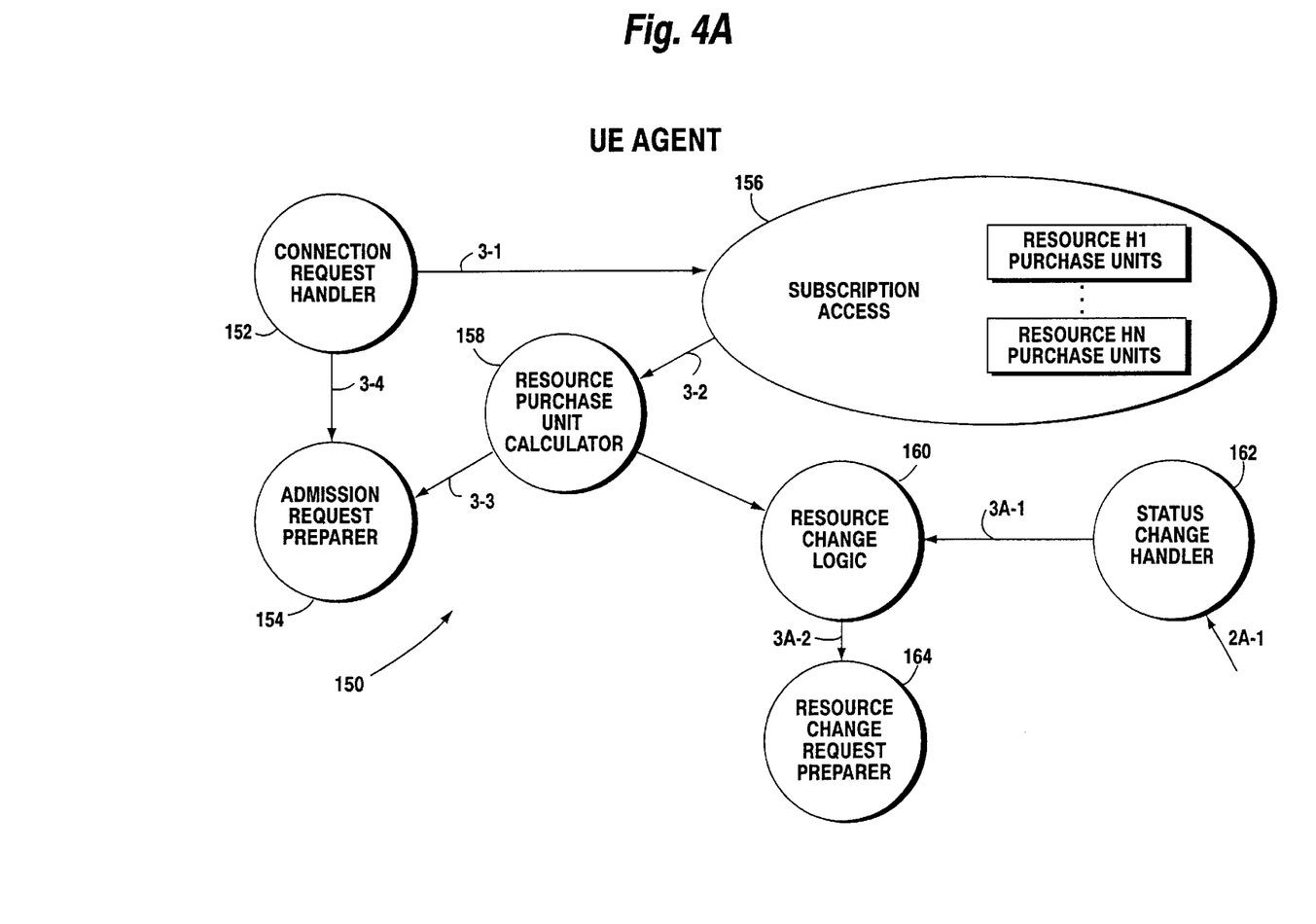
FIG. 4A is a diagrammatic view of basic functions performed by a user equipment unit agent of the telecommunication system of FIG. 1A.

The user equipment agent 150 for the embodiment of FIG. 2A is shown in FIG. 4A as including resource change logic 160; status change handler 162; and resource change request preparer 164, in addition to the functions previously described in FIG. 4. It is status change handler 162 that receives and processes the change status notification 2A-1. As indicated by action 3A-1, the status change handler 162 communicates the status change to resource change logic 160. The resource change logic 160 estimates whether it would be worthwhile for user equipment agent 150 to attempt to re-negotiate for connection resources. For example, resource change logic 160 may estimate that a potential greater allocation of connection resources could now be obtained. Alternatively, the resource change logic 160 may realize that user equipment unit 20 is over extended in view of present network load conditions, and attempt to scale back resource utilization on its own before potentially more drastic measures are taken by telecommunication system 18. In either case, when a re-negotiation appears feasible, as depicted by action 3A-2 resource change logic 160 authorizes resource change request preparer 164 to prepare a re-negotiation bid to submit to one or more resource managers.

The determination of resource change logic 160 is facilitated by availability of the number of purchase units computed by resource purchase unit calculator 158 and the number of purchase units for user equipment agent 150 as acquired by subscription access function 156. The number of purchase units held by user equipment agent 150 is communicated to admission control unit 106 in the bid submitted by resource change request preparer 164. FIG. 2A shows user equipment agent 150 submitting a re-negotiation bid to admission control unit 106 (action 2A-2). Admission control unit 106 submits the re-negotiation bid to each of code manager 110 and power manager 112, as indicated by respective actions 2-3A and 2-4A shown in FIG. 2A.

FIG. 3A shows that the resources managers 180 process the re-negotiation bid in much the same manner as above discussed in connection with FIG. 3. However, the processing by admission control 106 differs for a re-negotiation bid. In this regard, at step 302 the admission control unit 106 ascertains that resources have already been allocated for the connection (e.g., this is not an admission request). Then, at step 304, the admission control unit 106 determines whether the user equipment agent 150 has sufficient purchase units to buy the requested new level of resource(s). If the price tag for the requested new level of resources cannot be afforded, a failure notification is prepared at step 308 and sent to user equipment agent 150. If the price tag for the requested new level of resources is affordable by user equipment agent 150, a success notification is prepared at step 306 and sent to user equipment agent 150.

Thus, in the particular example illustrated in FIG. 2A in which additional resources are requested by user equipment agent 150 via admission control unit 106 from both code manager 110 and power manager 112, action 2A-4 and 2A-5 are messages from code manager 110 and power manager 112 advising admission control unit 106 of the cost of the respective resources. Further, action 2-7A shows admission control unit 106 providing the user equipment agent 150 with either a success (acceptance) or a failure (rejection) notification.

As an example scenario, suppose that the subscription information for equipment unit 20 indicates a very low priority (e.g., a low budget subscription) and that user equipment unit 20 is located near a boarder of a cell. Being at the boarder of the cell, the user equipment unit 20 must request considerable power. Further, the fact that user equipment unit 20 is near the cell boundary indicates that user equipment unit 20 will likely need to be connected to plural cells (for diversity purposes). The user equipment agent 150 for user equipment unit 20 determines how much "power" money, how much "bitrate" money, and whatever other resources user equipment unit 20 will require (e.g., how many power purchase units, how many bitrate purchase units the user equipment unit 20 will require). This assignment of money (i.e., resource purchase units) is independent of system requirements, and reflects how the different parameters and priorities associated with the user equipment unit 20 are converted into something that can be compared with what the system can offer, and what other users have. In this scenario, assume further that the system has significant load. The price list manager 122 therefore sets high values for resource unit prices 202 (e.g., for the power unit price, the bitrate unit price, etc.), making it very difficult to purchase resources. So in this scenario, when user equipment unit 20 as represented by its user equipment agent 150 negotiates with admission control unit 106 to obtain a channel with some power and bitrate, user equipment agent 150 will likely obtain the lowest quality possible, because the prices are so high and the priority of user equipment unit 20 is so low (as reflected by the low amount of purchase units). When the connection with user equipment unit 20 is added, the resource manager(s) note the depletion of resources caused by the addition of user equipment unit 20, and so notify price list manager 122. Accordingly, price list manager 122 raises the prices on price list 120 due to this new allocation.

In the foregoing scenario, it can happen at some later time that user equipment unit 20 tries to re-negotiate to obtain more resources (e.g., higher bitrate). If in the meantime some channels had been deallocated, such deallocation would be reflected by decreased prices on price list 120. If user equipment agent 150 attempts to re-negotiate at this time, the additional resources may be obtained in view of their decline in price.

Figure 1A:
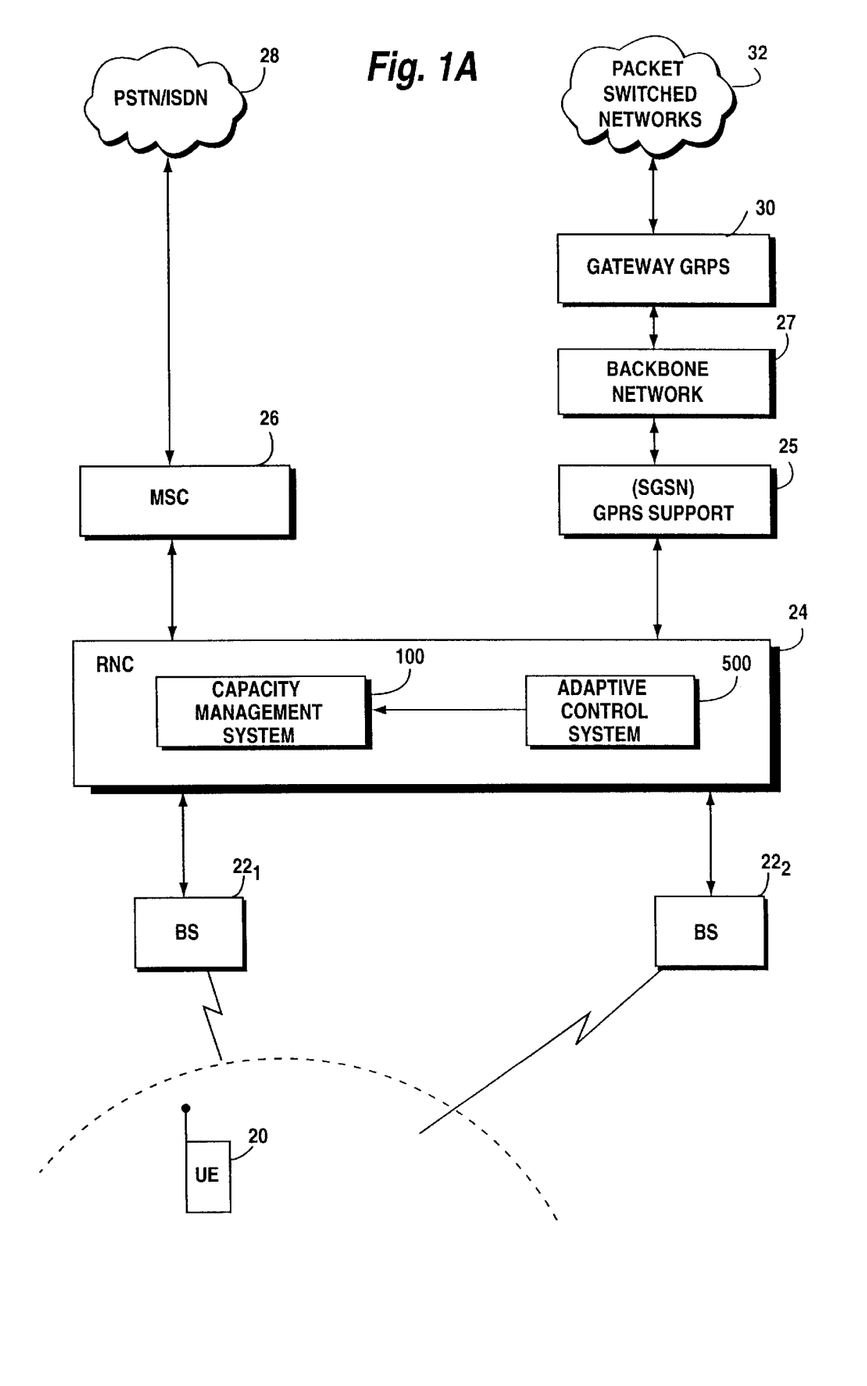
FIG. 1A is a schematic view of a telecommunication system according to another embodiment of the present invention.
Figure 3B:
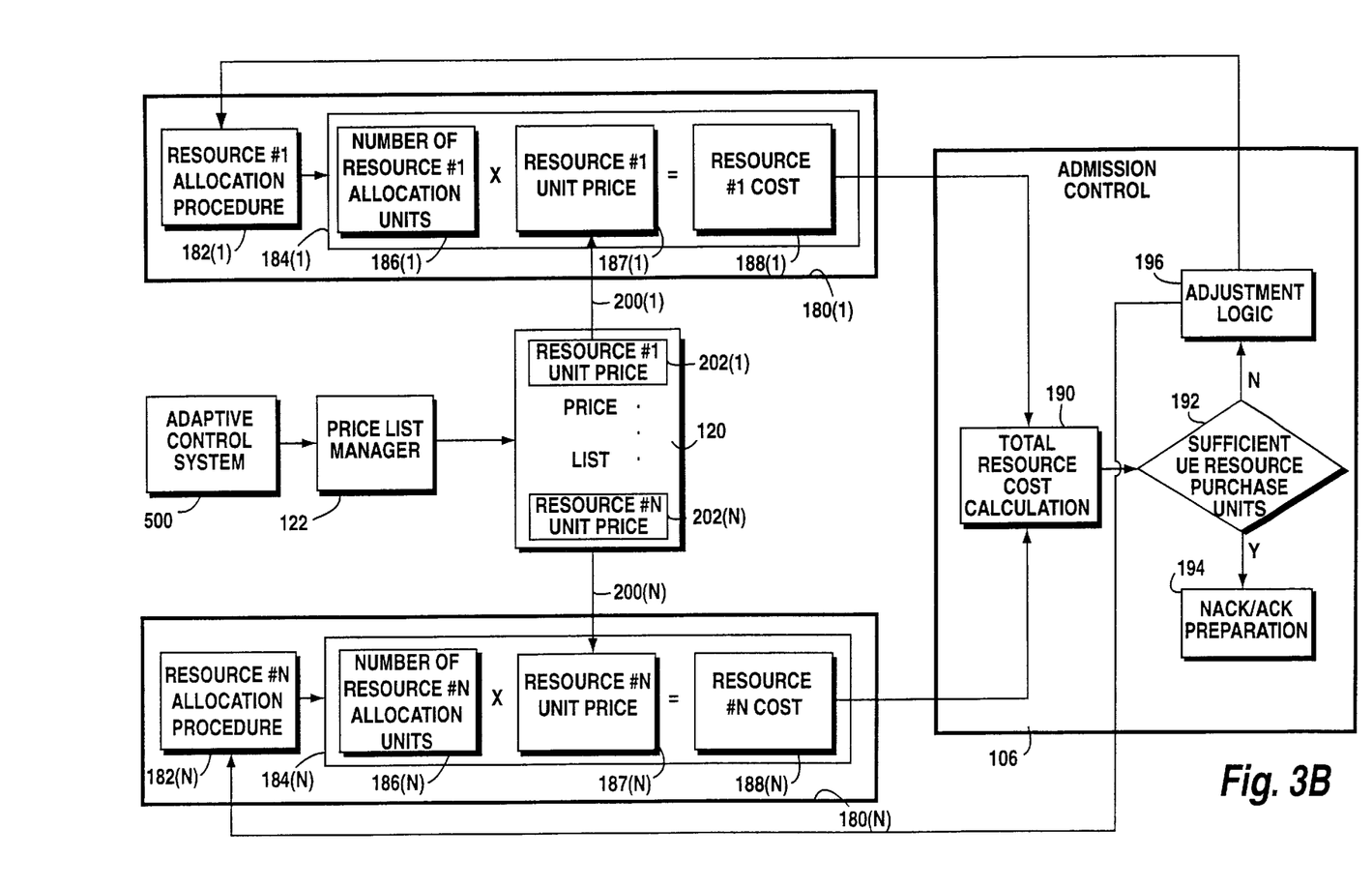
FIG. 3B is a diagrammatic view showing basic operations performed in connection with a resource negotiation according to the embodiment of FIG. 2 in the embodiment of FIG. 1A.

As indicated above, the resource unit prices stored on price list 120 are updated by price list manager 122. The update of the resource unit prices stored on price list 120 can occur in any of a variety of manners, and for diverse reasons. One example of why and how the resource unit prices stored on price list 120 can be updated is provided in context of a further aspect of the invention, particularly an adaptive control system. In this regard, FIG. IA and FIG. 3B show another embodiment of telecommunication system 18 in which radio network controller (RNC) node 24 is additionally provided with adaptive control system 500 which works in conjunction with capacity management system 100. FIG. 3B differs from FIG. 3 by showing adaptive control system 500 being utilized to provide information to price list manager 122, so that the prices on price list 120 can be updated in accordance with the present invention.

Figure 5:
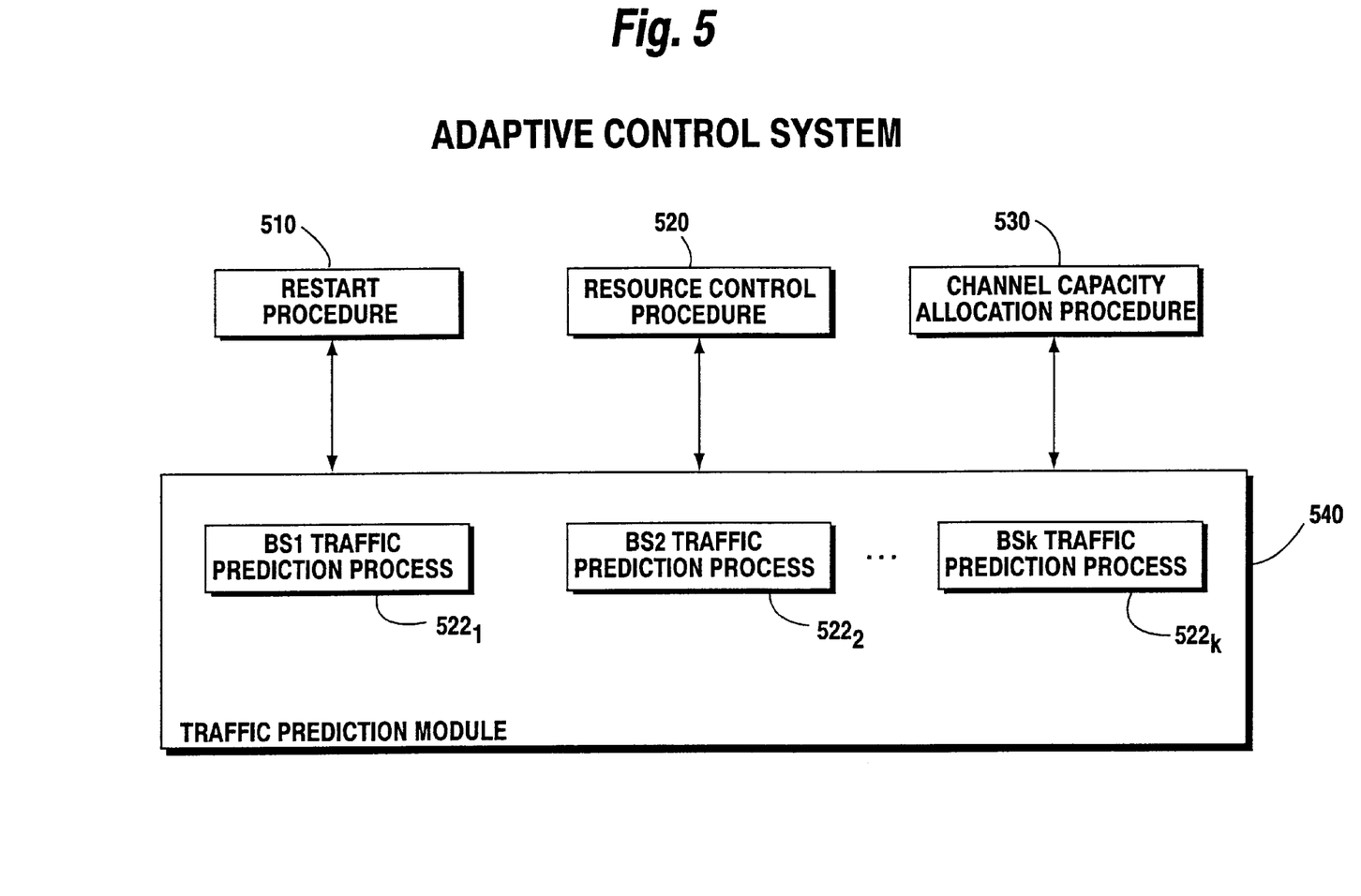
FIG. 5 is a diagrammatic view of an adaptive control system for a node of the telecommunication system of the present invention.

As shown in more detail in FIG. 5, one example adaptive control system 500 includes various adaptive procedures, such as restart procedure 510, resource control procedure 520, and channel capacity allocation procedure 530. In addition, adaptive control system 500 includes a traffic prediction module 540. The traffic prediction module 540. The traffic prediction module 540 includes processes for one or more of the base stations controlled by the radio network controller (RNC) node 24 whereat adaptive control system 500 is executed. FIG. 5 shows traffic prediction processes $542_1$ through $542_k$ for each of base stations $22_1$ through $22_k$, respectively.

Figures 6, 7, 7A:
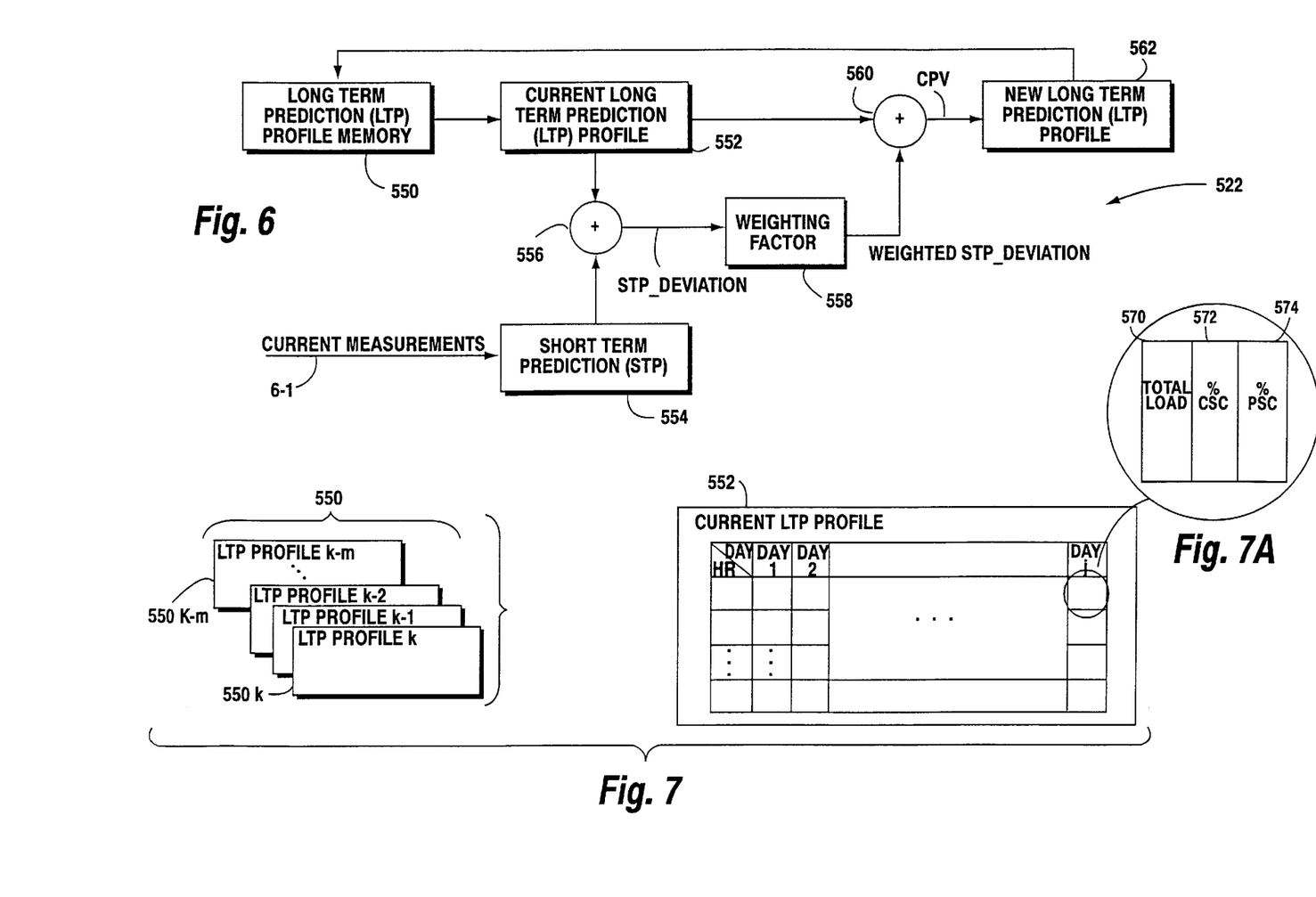
FIG. 6 is a schematic view of a base station prediction process according to an embodiment of the present invention.
FIG. 7 is a diagrammatic view depicting development of a current long term prediction profile in accordance with the present invention.
FIG. 7A is a diagrammatic view showing an entry in the current long term prediction profile of FIG. 7.

An example traffic prediction processes 542 for adaptive control system 500 is illustrated in FIG. 6. The example traffic prediction processes 542 includes a long term prediction (LTP) profile memory 550 in which plural long term prediction (LTP) profile records are stored. The profile records in long term prediction (LTP) profile memory 550 are used to develop a current long term prediction (LTP) profile 552. Current traffic measurements/statistics for the cell associated with the base station are obtained and input (as indicated by arrow 6-1) to a short term prediction (STP) logic unit 554. The current traffic measurements/statistics for the cell input at arrow 6-1 include both the total load for the cell and an indication of the current mix of circuit switched connections (CSC) and packet switched connections (PSC) for the cell [e.g., 80% CSC and 20% PSC]. An entry for the current time from the current long term prediction (LTP) profile 552 and the output of the short term prediction (STP) logic unit 554 are both applied to summer 556 to obtain an STP_deviation. The STP_deviation represents the deviation of the actual current conditions from the predicted conditions as ascertained by current long term prediction (LTP) profile 552. A weighting factor is multiplied for the STP_deviation by weighting factor multiplier 558, which outputs a weighted STP_deviation. The weighted STP_deviation is summed by summer 560 with the actual current conditions [from the predicted conditions ascertained from current long term prediction (LTP) profile 552] to obtain a current prediction value (CPV). The current prediction value (CPV) is used to develop a new long term prediction (LTP) profile 562. At an appropriate time, the new long term prediction (LTP) profile 562 (which is accumulated over a specified time period) is then loaded into long term prediction (LTP) profile memory 550 for future use in determining a new current long term prediction (LTP) profile 552.

FIG. 7 shows that long term prediction (LTP) profile memory 550 comprises plural LTP profiles, profiles 550k through 550k–m being illustrated. The current long term prediction (LTP) profile 552, illustrated in more detail in FIG. 7, is obtained from long term prediction (LTP) profile memory 550. The current long term prediction (LTP) profile 552 has an entry for each time period (e.g., hour) for each of a range (e.g., week) of days. Each entry in current long term prediction (LTP) profile 552, corresponding to a specified hour of a specified day of the week in the illustrated example, is shown as a row/column intersection block in FIG. 7. FIG. 7A shows in magnified fashion various example sub-entries for each entry in current long term prediction (LTP) profile 552. For example, each entry in current long term prediction (LTP) profile 552 includes a total load entry 570, a percent load of circuit switch connection entry 572; and a percent load of packet switch connection entry 574.

In one example embodiment, the current long term prediction (LTP) profile 552 is developed using a linear combination of values from the plural profiles in long term prediction (LTP) profile memory 550. In the linear combination, the various constituent profiles in long term prediction (LTP) profile memory 550 can be weighted, with the most recent profile 550k have a greatest weight, a next most recent profile 550k–l having a next greatest weight, and so forth. Other weighting schemes are, of course, also possible.

The load information ascertained by adaptive control system 500 is in one illustrated embodiment utilized by price list manager 122 to dynamically adjust the resource unit prices 202 in price list 120. For example, when the weighted STP_deviation value (see FIG. 6) exceeds a predetermined percentage, the price list manager 122 can correspondingly change the resource unit price 202 for one or more resources in price list 120. If the weighted STP_deviation value increases, the resource unit prices 202 can be increased correspondingly. On the other hand, if the weighted STP_deviation value decreases, the resource unit prices 202 can be decreased correspondingly.

As one feature of the embodiment of FIG. 2A, the restart procedure 510 of adaptive control system 500 can use the information in traffic prediction module 540 to define the start order for various resources. Resources in areas with suspected high traffic load, as evidenced by the traffic prediction processes 542 for the various base stations, can be started before resources are utilized in other areas (e.g., other base stations). Thus, restart procedure 510 is adapted to the actual traffic profile. For example, if a system restart occurs during normal office hours (e.g., during an hour of the work day), the resources employed to cover a business region can be started before resources in other areas with less traffic load (e.g., a residential area). Thus, if the traffic load peak moves around in the telecommunication system as a function of the time of the day, the restart order for the various resources is adapted to the movement of the traffic load peak.

In addition, the information in the traffic prediction processes 542 can also be used to decide what type of services are most frequently requested, and thereby used by resource control procedure 520 to pre-allocate and pre-configure (e.g., pre-start) resources for those services. For instance, in a geographical area in which voice calls dominate at a certain time of the day, the system can pre-allocate and configure resources for voice calls and store the "voice channels" in a pool of pre-configured resources. When a call is established, the call establishment procedure can pick a "voice channel" from the pool. The number of pre-allocated and configured resources (for a specific purpose) is kept in relation to the traffic profile for the specific call type.

In a wideband CDMA system, switching between channel types with different capacity is a difficult problem for which an adaptive scheme such as that provided by adaptive control system 500 is particularly useful. When telecommunication system 18 is to make decisions about what capacity a user is to be allocated, it is advantageous to be able to make good estimates regarding the traffic profile. In this regard, channel capacity allocation procedure 530 of the adaptive control system 500 of the present invention uses the long term prediction (LTP) profile and short term prediction (STP) profiles described above to make good estimates regarding the kind of expected users, and how large the load will be at any point in time. For example, suppose the profile for a base station in traffic prediction module 540 indicates that there is hardly any activity in the associated cell early on Sunday mornings. In such case, if a user is to be allocated a dedicated data channel, the channel capacity allocation procedure 530 can allocate to the user a large capacity, as hardly anyone else uses mobile communications at that time. Conversely, a mobile system can be very restrictive in distributing large capacities during an afternoon rush hour, as likely many people will be leaving their work places and placing voice calls in route home.

Thus, the adaptive control system 500 of the present invention affords various advantages. By using restart procedure 510, resources employed in high traffic load areas are started earlier than resources in low traffic load areas, which means that the system is capable of providing services in high traffic load areas where the capacity is needed before providing services in other areas with a lower capacity need. By using the resource control procedure 520, the resources can be pre-allocated and configured to map the need, which means that call setup time is minimized for the most frequently used service. Further, by using the channel capacity allocation procedure 530, the system is more efficient in distributing its capacity. In this latter regard, in the ideal case, when the traffic looks about the same every week, the system has the best possible chance to make good decisions about channel switching. Such is particularly applicable at certain "scheduled" spots, such as bus stops, airports, schools and the like, where the behavior from week to week is very similar and thus the adaptivity can provide significant advantages.

Advantageously, the present invention permits accommodation of new functionality without having to change significantly existing processes.[need to develop this in greater detail]. For example, system modifications can be reflected by changing the prices on price list 120, with the result that the executable code of the system processes may not need to be changed While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system for establishing a connection with a wireless user equipment unit, the telecommunications system comprising:

a user equipment unit agent which determines a number of purchase units expendable by the user equipment unit and which uses a resource request to negotiate for connection resources to be utilized in the connection;

a capacity management system comprising:

a resource price list which includes a resource unit price for each of plural connection resources requested for the connection from the telecommunications system, the resource unit price for each of the plural connection resources being dynamically adjusted in accordance with load on the telecommunication system;

a controller which responds to the resource request by allocating connection resources to the user equipment unit in accordance with what the number of purchase units expendable by the user equipment unit can afford.

2. The apparatus of claim 1, wherein the resource request is a connection admission request.

3. The apparatus of claim 1, wherein at least one of the plural connection resources is transmission power.

4. The apparatus of claim 1, wherein at least one of the plural connection resources is a spreading code.

5. The apparatus of claim 1, wherein at least one of the plural connection resources is bit rate.

6. The apparatus of claim 1, wherein at least one of the plural connection resources is a number of handover legs.

7. The apparatus of claim 1, wherein the number of purchase units expendable by the user equipment unit is classified into a number of purchase units expendable for each of the plural connection resources.

8. The apparatus of claim 7, wherein the controller processes the resource request on a per connection resource basis.

9. The apparatus of claim 1, wherein after an initial allocation of sources for the connection, the user equipment unit agent re-negotiates with the resource manager for the first connection resource.

10. The apparatus of claim 9, further comprising a load manager which apprises the user equipment unit agent of a status change in the telecommunication system.

11. The apparatus of claim 10, wherein the user equipment unit agent re-negotiates in response to the status change.

12. The apparatus of claim 1, further comprising an adaptive control system which determines the load on the telecommunication system, and wherein resource unit price for each of the plural connection resources is dynamically adjusted in accordance with the load on the telecommunication system.

13. The apparatus of claim 12, wherein the adaptive control system determines a predicted load on the telecommunication system.

14. The apparatus of claim 13, wherein the adaptive control system determines a predicted load on the telecommunication system by using a long term prediction profile and a short term prediction profile.

15. The apparatus of claim 1, wherein the user equipment unit agent is included in the capacity management system.

16. A method of operating a telecommunications system which establishes a connection with a wireless user equipment unit, the method comprising:

using a user equipment unit agent for the user equipment unit to determine a number of purchase units expendable by the user equipment unit and to issue a resource request to negotiate for connection resources to be utilized in the connection;

providing a resource price list which includes a resource unit price for each of plural connection resources requested for the connection from the telecommunications system;

dynamically adjusting the resource unit price for each of the plural connection resources in accordance with load on the telecommunication system;

responding to the resource request by allocating connection resources to the user equipment unit in accordance with what the number of purchase units expendable by the user equipment unit can afford.

17. The method of claim 16, wherein the resource request is a connection admission request.

18. The method of claim 16, wherein at least one of the plural connection resources is transmission power.

19. The method of claim 16, wherein at least one of the plural connection resources is a spreading code.

20. The method of claim 16, wherein at least one of the plural connection resources is bit rate.

21. The method of claim 16, wherein at least one of the plural connection resources is a number of handover legs.

22. The method of claim 16, further comprising classifying the number of purchase units expendable by the user equipment unit into a number of purchase units expendable for each of the plural connection resources.

23. The method of claim 22, further comprising processing the resource request on a per connection resource basis.

24. The method of claim 16, further comprising providing a resource manager for a first connection resource and wherein, after the resources are initially allocated to the connection, using the user equipment unit agent to re-negotiates with the resource manager for the first connection resource.

25. The method of claim 24, further comprising apprising the user equipment unit agent of a status change in the telecommunication system.

26. The method of claim 25, further comprising the user equipment unit agent re-negotiating in response to the status change.

27. The method of claim 16, further comprising adaptively determining the load on the telecommunication system, and wherein the resource unit price for each of the plural connection resources is dynamically adjusted in accordance with the load on the telecommunication system.

28. The method of claim 27, wherein the step of adaptively determining the load on the telecommunication system includes determining a predicted load on the telecommunication system.

29. The method of claim 28, further comprising determining a predicted load on the telecommunication system by using a long term prediction profile and a short term prediction profile.

* * * * *